(12) United States Patent
O'Neill et al.

(10) Patent No.: US 6,779,056 B2
(45) Date of Patent: Aug. 17, 2004

(54) DIRECT DATA PLACEMENT AND MESSAGE REASSEMBLY

(75) Inventors: Eugene O'Neill, Dublin (IE); Richard A Gahan, Gory (IE)

(73) Assignee: 3Com Corporation, Santa Clara, CA (US)

( * ) Notice: Subject to any disclaimer, the term of this patent is extended or adjusted under 35 U.S.C. 154(b) by 303 days.

(21) Appl. No.: 09/897,044

(22) Filed: Jul. 3, 2001

(65) Prior Publication Data

US 2002/0118703 A1 Aug. 29, 2002

(30) Foreign Application Priority Data

Feb. 28, 2001 (GB) .............................................. 0104940

(51) Int. Cl.[7] ................................................ G06F 3/00
(52) U.S. Cl. ........................ 710/52; 710/65; 709/232; 709/236; 711/173; 370/351
(58) Field of Search ..................... 710/65, 52; 370/351; 709/236, 232; 711/173

(56) References Cited

U.S. PATENT DOCUMENTS 5,265,261 A    11/1993  Rubin et al.
5,799,155 A     8/1998  Yasue et al.
5,916,309 A  *  6/1999  Brown et al. .................. 710/52
5,974,518 A  * 10/1999  Nogradi ....................... 711/173
6,237,038 B1 *  5/2001  Yasue et al. ................. 709/236
2002/0095512 A1 *  7/2002  Rana et al.

FOREIGN PATENT DOCUMENTS

EP           0608541 A2    8/1994
EP           0657824 A1    6/1995
WO        WO 01/75621 A1  10/2001

* cited by examiner

Primary Examiner—Jeffrey Gaffin
Assistant Examiner—Justin Knapp
(74) Attorney, Agent, or Firm—Nixon & Vanderhye PC

(57) ABSTRACT

A direct data placement implementation for a data reassembly process. Data within a protocol data unit is placed directly in preassigned application buffers. The network interface card has buffer space into which message headers, segment headers and indicators of escaped data and size of escaped data are placed. A single buffer can contain this information for a complete PDU (or message) and is handed over to enable the next process to run on a per message basis.

16 Claims, 2 Drawing Sheets

DIRECT DATA PLACEMENT AND MESSAGE REASSEMBLY

FIELD OF THE INVENTION

This invention relates to direct placement of bulk data into application buffers and reassembly of messages.

BACKGROUND OF THE INVENTION

When data is transmitted from one device to another it is controlled by a protocol such as Transport Control Protocol (TCP). A receiving device or host runs a receive process that moves the data to the required destination such as application buffers. Nowadays this process is usually implemented in software.

In current implementations data is moved via the Network Interface Card (NIC) to TCP receive buffers in the host memory. The Central Processing Unit (CPU) receives an interrupt, which may be on a per segment basis. The TCP receive process verifies that the data is in order, also on a per segment basis, and the data is finally copied into application buffers.

During this process there are two data moves across the system bus and per segment TCP receive processing by the host is slow.

The data transmitted by the TCP protocol will have originated in another 'higher layer' protocol. One such protocol is the iSCSI specification that defines a transport protocol for SCSI and maps the SCSI remote procedure invocation model on top of TCP.

Communications between a device on a network and a server (often termed client and server, or in SCSI specification 'Initiator' and 'Target') are divided into messages, termed iSCSI protocol data units (PDUs). The iSCSI PDUs are variable in length and consist of a message iSCSI header plus optional data, also termed the bulk data. Typically the bulk data consists of data blocks being moved between client and server.

TCP also uses variable length segments and packages PDUs received from iSCSI into segments for the transmission. An individual iSCSI PDU may be packaged across several TCP segments, for example when it contains a lot of data in addition to the iSCSI header, or when the iSCSI PDUs contain only headers of control or status information and no bulk data, several PDUs may be packaged into a single TCP segment.

Although there are not current implementations, there are proposals under iSCSI protocol for direct placement of the data portions of the iSCSI PDUs into preassigned application buffers in host memory without it being stored in TCP receive buffers. This would save on bus bandwidth, as the data is not transferred twice, and on the TCP receive side buffer space is also saved as the bulk data is not stored in the TCP receive buffers.

SUMMARY OF THE INVENTION

The present invention is directed towards implementing direct data placement message reassembly.

According to the invention there is provided a data reassembly process for a message that comprises a header and a bulk data portion and is received in a plurality of segments, in which bulk data is placed directly into application buffers and a receive buffer stores an indication of the size of the directly placed data from a plurality of segments.

The invention also provides an interface for a data reassembly process for messages that each comprise a header and a bulk data portion that are received in a plurality of segments and for which the bulk data can be placed directly into application buffers, the interface comprising a receive buffer for storing summary information including indication of the cumulative size of the directly placed data from said plurality of segments.

BRIEF DESCRIPTION OF THE DRAWINGS

The invention is now described by way of example with reference to the accompanying drawings in which.

DETAILED DESCRIPTION OF PREFERRED EMBODIMENT

Figure 1:
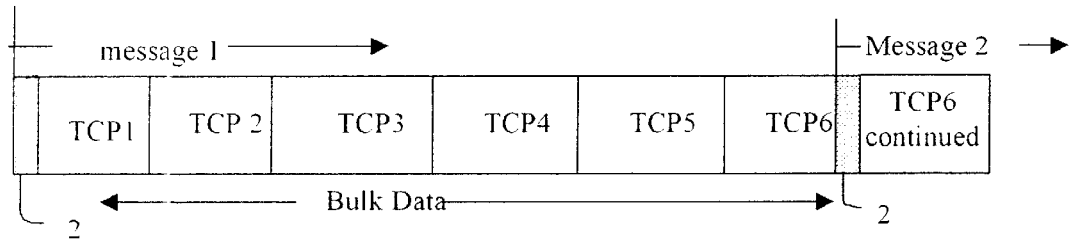
FIG. 1 is a schematic diagram of a message structure.

Referring now to FIG. 1, a typical message that can be utilised in the invention consists of a message header 1 followed by a series of segments, indicated in the drawing as TCP 1, TCP2 . . . TCP6, although protocols other than TCP could be used. This is then followed by a second message that also starts with a header 1 and has its own series of segments. The type of package utilised in the invention also has indicators that enable location of message boundaries iSCSI protocol for example includes such indicators. It will be appreciated that the message may have more than 6 segments, or fewer. It will also be noted that TCP6 contains the end of message 1 and the start of message 2.

With a direct data placement system the bulk data occupying the segments TCP1 . . . TCP6 is directly copied to preassigned application buffers. This data may be several kilobytes, say for example 8 Kbytes, and is represented in FIG. 1 by the entire message minus the header. The application buffers may be regarded as the next stage of the process after the arrival order of data has been checked (or reassembled).

Figure 2:
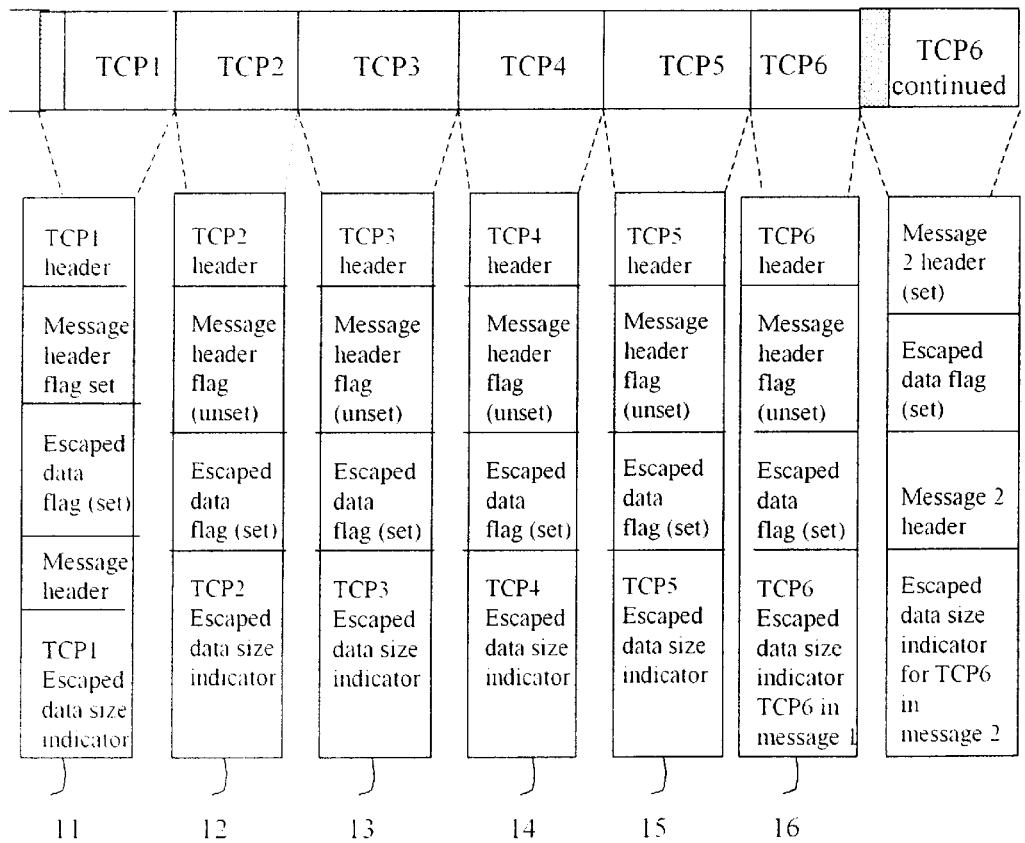
FIG. 2 is a schematic diagram of handling of direct data placement by a plurality of receive buffers.

Referring now to FIG. 2, a structure is shown having the same general TCP receive buffer arrangement as may currently be used for receiving message segments complete with their data. However as the direct data placement procedure is to be used, the buffers can be smaller and could be placed on the NIC itself. When the data stream arrives at the NIC it is parsed for the message boundary (from length data contained in the message header) and the bulk data is routed to the preassigned application buffers. The information relating to each segment TCP1 to TCP6 is read into its own TCP reassembly buffer, shown as buffers 11 to 16 corresponding to TCP1 through to TCP6 for message 1. Each of the buffers receives a header identifying the segment, i.e., TCP1 header and so on, and a flag indicating that the data has been placed in the application buffers together with an indication of the size of that directly placed data. This is referred to as an "Escaped data" flag. Another flag indicates whether or not the buffer also contains a message header. Finally the buffer contains an indicator of the size of the escaped data. The TCP1 receive buffer contains the message header and so the header flag is set.

With this system at least one buffer is required for each segment, TCP6 requires a second buffer as it straddles a message. Apart from the utilisation of escaped data, this procedure is analogous to that currently used where the buffers also have to contain the data, but achieves advantages in smaller buffer size and bus bandwidth utilisation as envisaged by the iSCSI direct data placement proposals.

The present invention provides an implementation of direct data placement to save bandwidth and buffer size, and also improves speed and provides a further simplification in the buffer structure.

Figure 3:
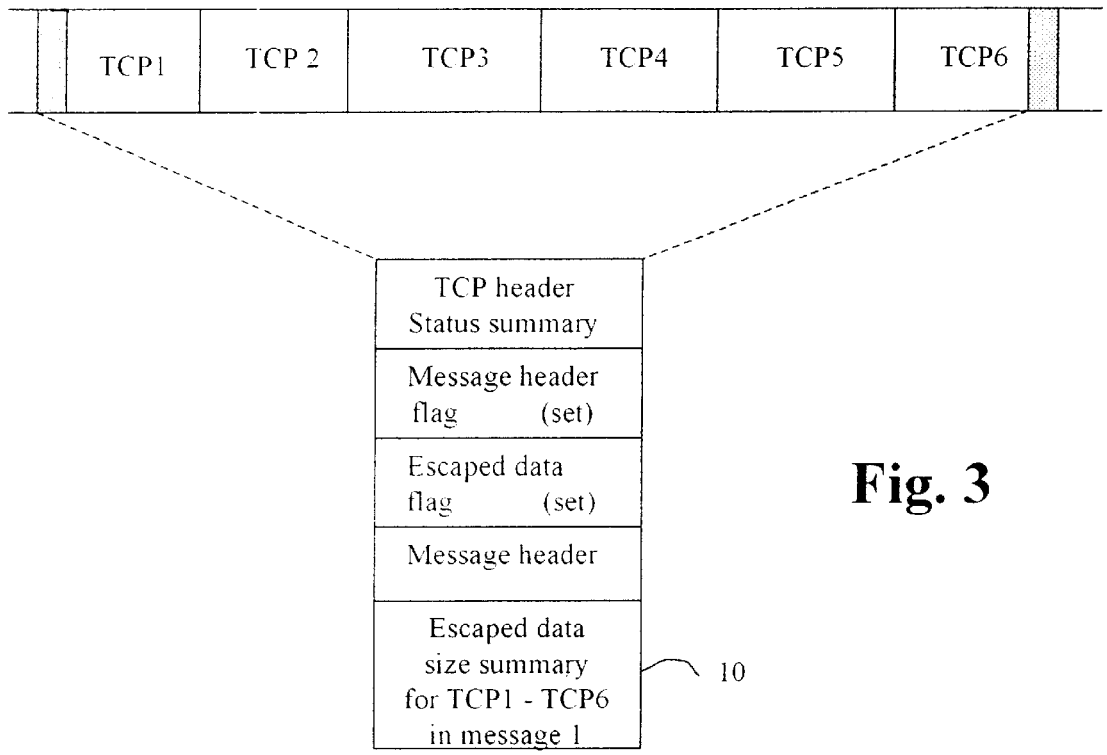
FIG. 3 is a schematic diagram of handling of direct data placement by a summary receive buffer in accordance with the present invention.
Figure 4:
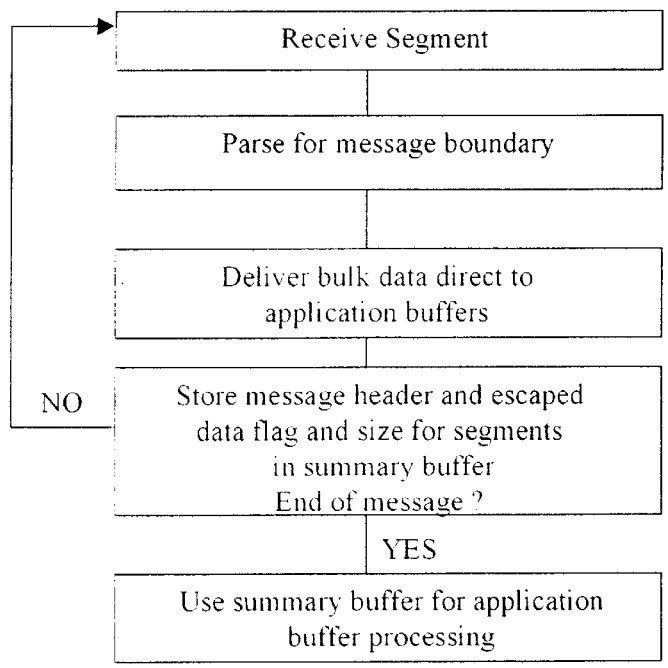
FIG. 4 is a flow diagram of the receive process of the present invention.

Referring now to FIG. 3, in the present invention, a reduced number of TCP receive buffers are required, preferably utilising only a single buffer 10 for each message. When TCP1 arrives the message header is copied into the buffer along with its corresponding escaped data marker and message header present flag. As described in respect of FIG. 2 the size of the escaped data is put into the buffer by way of an indicator. When TCP2 arrives, the escaped data size indicator is modified to include the size of escaped data from TCP2. The buffer then becomes similarly updated with the cumulative escaped data size for the remaining segments as they arrive in turn and the single buffer ends up with a header summarizing the segment headers, the message header and escaped data flags and an escaped data size summary for the entire message.

The summarised single buffer 10 is then handed over to the next stage of processing on the host, which now only has to refer to a single buffer for the entire message. The reduction in the number of TCP receive buffers required enables a simpler and a less costly implementation, preferably on the NIC, and also enables the speed to increase from a per segment process to a per message process.

The direct data placement system in general relies upon the segments of a message arriving in order, which is the case the majority of the time. However, it is also necessary to deal with the situation of segment loss or out of order segments. One way to handle this is for the direct data placement to stop and for the NIC to revert to receiving complete messages including data, and checking the order and transferring in the prior art manner. Additional buffers for such emergency use need to be provided and also a system for recommencing direct data placement. In the iSCSI standard the data stream has a marker at regular intervals that indicates where the next message boundary is located. Thus if segments arrive out of order the NIC abandons tracking and direct data placement of the PDU in progress, uses the reserve emergency buffer facility for the full data as well as headers of that PDU, and restarts direct data placement operation once the next marker indicates the start of the next message boundary.

From this it will be appreciated that although buffer size and quantity is of the general level to support one summary buffer per message, which of course requires some flexibility in itself to cope with varying message length, sufficient reserve buffer space is also provided to cope with the loss of tracking. However, as this is not required for every PDU, the overall buffer space required is still very much reduced.

What is claimed is:

1. A process for the reassembly of a message constituted by a plurality of Transmission Control Protocol (TCP) segments, each of said TCP segments comprising a TCP header and respective bulk data, said method utilizing application buffers for the reception of said bulk data and comprising:
   placing said respective bulk data of each of said segments in said application buffers;
   copying the header of a first one of said TCP segments into a receive buffer separate from said application buffers;
   copying into said receive buffer an escaped data size indicator denoting the size of the respective bulk data placed from said first one of said TCP segments into said application buffers; and
   for a subsequent TCP segment in said message, modifying said escaped data size indicator to include the size of the bulk data which has been placed from said subsequent segment into said application buffers.

2. A process as in claim 1 and further comprising:
   copying into said receive buffer an escaped data flag indicating the placement of bulk data from said first one of said TCP segments into said application buffers; and
   for each subsequent TCP segment in said message, copying into said receive buffer a respective escaped data flag denoting the placement of bulk data from that segment into the application buffers.

3. A process for the reassembly of a message constituted by a plurality of Transmission Control Protocol (TCP) segments, each of said TCP segments comprising a TCP header and bulk data, said method utilizing application buffers for the reception of said bulk data comprising:
   placing said bulk data of each of said segments in said application buffers;
   placing header information of a first one of said TCP segments in a receive buffer separate from said application buffers;
   placing in said receive buffer for said first one of said TCP segments an escaped size indicator denoting the size of the respective bulk data which has been placed in the application buffers; and
   for each subsequent TCP segment in said message, updating said header information and modifying said escaped data size indicator to include the size of the bulk data which has escaped from said subsequent segment into said application buffers, so that said receive buffer accumulates header information relating to all the segments in the message and a cumulative escaped data size for the whole message.

4. A process as in claim 3 and further comprising referring to said receive buffer to process said message.

5. An interface for the reassembly of a message constituted by a plurality of Transmission Control Protocol (TCP) segments, each of said TCP segments comprising a TCP header and respective bulk data, said interface comprising:
   application buffers for the reception of said bulk data directly from said segments, and
   a receive buffer, separate from said application buffers, for the reception of TCP summary header information relating to all said TCP segments in said message and a cumulative escaped data size indicator denoting the cumulative size of the bulk data placed from all said TCP segments in said message into said application buffers.

6. An interface as in claim 5 wherein said receive buffer receives for each TCP segment in said message a flag denoting the placement of bulk data from said each TCP segment into said application buffers.

7. A process for the reassembly of a message conforming to a message protocol including message boundary indicator, and constituted by a plurality of Transmission Control Protocol (TCP) segments, each of said TCP segments comprising a TCP header and respective bulk data, said method utilizing application buffers for the reception of said bulk data and comprising:
   placing said respective bulk data of each of said segments in said application buffers;
   placing the header of a first one of said TCP segments into a receive buffer separate from said application buffers;

placing in said receive buffer an escaped data size indicator denoting the size of the respective bulk data placed from said first one of said TCP segments into said application buffers; and for each of the subsequent TCP segments in said message, modifying said escaped data size indicator to include the size of the bulk data which has been placed from said subsequent segment into said application buffers.

8. A process as in claim 7 wherein said message protocol is iSCSI.

9. A process as in claim 7 and further comprising;

placing in said receive buffer an escaped data flag indicating the placement of bulk data from said first one of said TCP segments into said application buffers; and for each of said subsequent TCP segments in said message, placing into said receive buffer a respective escaped data flag denoting the placement of bulk data from that segment into the application buffers.

10. A process for the reassembly of a message conforming to a message protocol that includes message boundary indicators and constituted by a plurality of Transmission Control Protocol (TCP) segments, each of said TCP segments comprising a TCP header and respective bulk data, said method utilizing application buffers for the reception of said bulk data comprising:

placing said respective bulk data of each of said segments in said application buffers;

placing header information of a first one of said TCP segments in a receive buffer separate from said application buffers;

placing in said receive buffer for said first one of said TCP segments an escaped size indicator denoting the size of the respective bulk data which has been placed in the application buffers; and for each subsequent TCP segment in said message, updating said header information and modifying said escaped data size indicator to include the size of the bulk data which has escaped from said subsequent segment into said application buffers, so that said receive buffer accumulates header information relating to all the segments in said message and a cumulative escaped data size for the whole of said message.

11. A process as in claim 10 wherein said message protocol is iSCSI.

12. An interface for the reassembly of a message conforming to a message protocol that includes message boundary indicators and constituted by a plurality of Transmission Control Protocol (TCP) segments, each of said TCP segments comprising a TCP header and respective bulk data, said interface comprising:

application buffers for the reception of said bulk data directly from said segments, and a receive buffer, separate from said application buffers, for the reception of TCP summary header information relating to all said TCP segments and a cumulative escaped data size indicator denoting the cumulative size of the bulk data placed from all said TCP segments in said message into said application buffers.

13. An interface as in claim 12 wherein said receive buffer receives for each TCP segment in said message a flag denoting the placement of bulk data from each TCP segment into said application buffers.

14. A process for the reassembly of a message conforming to a message protocol including message boundary indicator, and constituted by a plurality of Transmission Control Protocol (TCP) segments, each of said TCP segments comprising a TCP header and respective bulk data, said method utilizing application buffers for the reception of said bulk data and comprising:

(a) when said TCP segments are received in a proper order:

(i) placing said respective bulk data of each of said segments in said application buffers;

(ii) placing the header of a first one of said TCP segments into a receive buffer separate from said application buffers;

(iii) placing in said receive buffer an escaped data size indicator denoting the size of the respective bulk data placed from said first one of said TCP segments into said application buffers; and (iv) for each subsequent TCP segment in said message, modifying said escaped data size indicator to include the size of the bulk data which has been placed from said subsequent segment into said application buffers; and (b) when said TCP segments are received out of said proper order:

(v) placing said TCP segments in reserve buffers instead of said application and receive buffers.

15. A process as in claim 14 and further comprising, when said TCP segments are received in said proper order:

placing in said receive buffer an escaped data flag indicating the placement of bulk data from said first one of said TCP segments into said application buffers; and for each said subsequent TCP segment in said message, placing into said receive buffer a flag denoting the placement of bulk data from that segment into the application buffers.

16. A process for the reassembly of a message conforming to a message protocol that includes message boundary indicators and constituted by a plurality of Transmission Control Protocol (TCP) segments, each of said TCP segments comprising a TCP header and respective bulk data, said method utilizing application buffers for the reception of said bulk data comprising:

(a) when said TCP segments are received in a proper order:

(i) placing said respective bulk data of each of said segments in said application buffers;

(ii) placing header information of a first one of said TCP segments in a receive buffer separate from said application buffers;

(iii) placing in said receive buffer for said first one of said TCP segments an escaped size indicator denoting the size of the respective bulk data which has been placed in the application buffers; and (iv) for each subsequent TCP segment in said message, updating said header information and modifying said escaped data size indicator to include the size of the bulk data which has escaped from said subsequent segment into said application buffers, so that said receive buffer accumulates header information relating to all the segments in said message and a cumulative escaped data size for the whole of said message; and (b) when said TCP segments are received out of said proper order:

(v) placing said TCP segments in reserve buffers instead of said application and receive buffers.

* * * * *